United States Patent
Okubo et al.

(10) Patent No.: US 6,580,703 B1
(45) Date of Patent: Jun. 17, 2003

(54) CDMA BASE STATION APPARATUS AND CODE ASSIGNMENT METHOD

(75) Inventors: Yoshiyuki Okubo, Yokohama (JP); Nobuo Asano, Yokohama (JP); Izumi Horikawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/391,092

(22) Filed: Sep. 16, 1999

(30) Foreign Application Priority Data

Sep. 24, 1998 (JP) .......................... 10-269608

(51) Int. Cl.[7] .......................... H04B 7/216; H04B 1/38; H04B 17/00; H04Q 7/20
(52) U.S. Cl. ...................... 370/335; 375/148; 455/524; 455/561; 455/424; 455/67.1
(58) Field of Search ................ 370/208, 209, 370/328, 329, 335, 342, 465, 468, 332, 437, 441; 375/147, 148, 267; 455/436, 437, 442, 450–452, 524, 525, 423, 424, 67.1, 561, 67.3

(56) References Cited

U.S. PATENT DOCUMENTS 5,345,469 A * 9/1994 Fulghum .................... 370/342
5,640,414 A * 6/1997 Blakeney, II et al. ....... 375/130
5,652,748 A * 7/1997 Jolma et al. ................ 370/320
6,128,288 A * 10/2000 Miya .......................... 370/335
6,343,070 B1 * 1/2002 Klas et al. .................. 370/329

FOREIGN PATENT DOCUMENTS

| CA | 2116601 | 9/1994 |
| JP | 9-102979 | 4/1997 |
| JP | 9-102979 A * | 4/1997 |

OTHER PUBLICATIONS

English Language Abstract of JP 9–102979.

* cited by examiner

*Primary Examiner*—Tracy Legree
(74) *Attorney, Agent, or Firm*—Greenblum & Bernstein, P.L.C.

(57) ABSTRACT

A code reader reads code specification information stored in a code list. An interference level measurer measures the interference level of a received signal despread with the code specification information read by the code reader. A threshold selector selects a code specification information corresponding to an interference level smaller than a preset threshold and stores the selected code specification information in a code candidate list. A code determiner determines the code specification information of a base station from the selected code specification information. When a new base station is added, a base station code may be automatically determined without needing a theoretical design for assigning codes to all base stations.

16 Claims, 20 Drawing Sheets

CDMA BASE STATION APPARATUS AND CODE ASSIGNMENT METHOD

BACKGROUND OF THE INVENTION

1. Field of the Invention

The present invention relates to a base station apparatus used in a CDMA-based radio communication system and its code assignment method.

2. Description of the Related Art

A CDMA-based base station apparatus (hereinafter simply referred to as "base station") presets code specification information specific to each apparatus, generates codes based on this code specification information and transmits signals multiplied by those codes. The code specification information is code phase for a PN code, etc. and code type for a Walsh code, etc.

In a conventional method of assigning codes to base stations, code specification information is fixedly assigned through advance theoretical design to base stations preventing them from interfering with one another.

However, if a new base station is added, the conventional method of assigning codes to base stations above has a problem of having the necessity of repeating theoretical design to assign codes to all base stations once again.

SUMMARY OF THE INVENTION

It is an objective of the present invention to provide a CDMA base station apparatus and code assignment method that will not require theoretical design to assign codes to all base stations even if a new base station is added.

The present invention achieves the objective above by reading stored code specification information and measuring its interference level, selecting code specification information whose interference level is smaller than a preset threshold as its own code information candidate and determining the code specification information of the station from the selected code specification information.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, the embodiments of the present invention are explained in detail below. In the explanations below, code type is used as code specification information.

Embodiment 1

Figure 1:
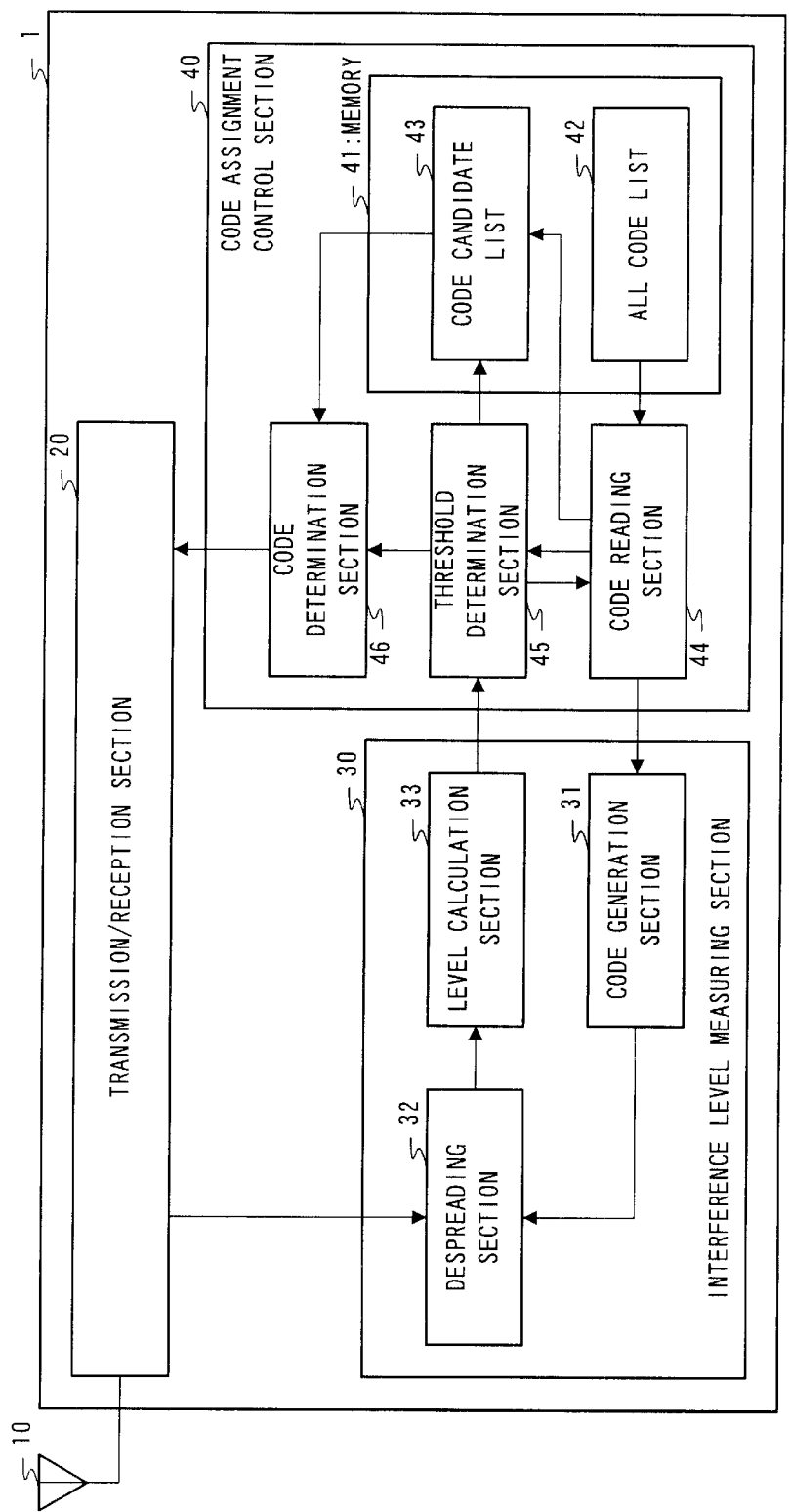
FIG. 1 is a block diagram showing a configuration of a base station in Embodiment 1 of the present invention.

FIG. 1 is a block diagram showing a configuration of a base station in Embodiment 1 of the present invention. Base station 1 in FIG. 1 mainly comprises transmission/reception section 20 that transmits/receives signals to/from a mobile station and receives a signal transmitted from another base station via antenna 10, interference level measuring section 30 that measures the interference level of a signal received by transmission/reception section 20 and code assignment control section 40 that performs code type assignment control based on the measured interference level.

Code assignment control section 40 comprises memory 41 that stores code types and memory 41 comprises all code list 42 that stores all code types in a list form and candidate code list 43 that stores code types to be assignment candidates in a list form.

Code assignment control section 40 also comprises code reading section 44 that reads code types from all code list 42 and outputs them to interference level measuring section 30, threshold determination section 45 that determines a code type to be an assignment candidate based on the interference level input from interference level measuring section 30 and a preset threshold and writes the code type to be an assignment candidate to candidate code list 43 and code determination section 46 that determines the code type of the station to be used from candidate code list 43 and outputs it to transmission/reception section 20.

Interference level measuring section 30 comprises code generation section 31 that generates codes based on a code type input from code reading section 44, despreading section 32 that despreads a received signal multiplied by a code and level calculation section 33 that calculates the interference level of the despread signal.

Figure 2:
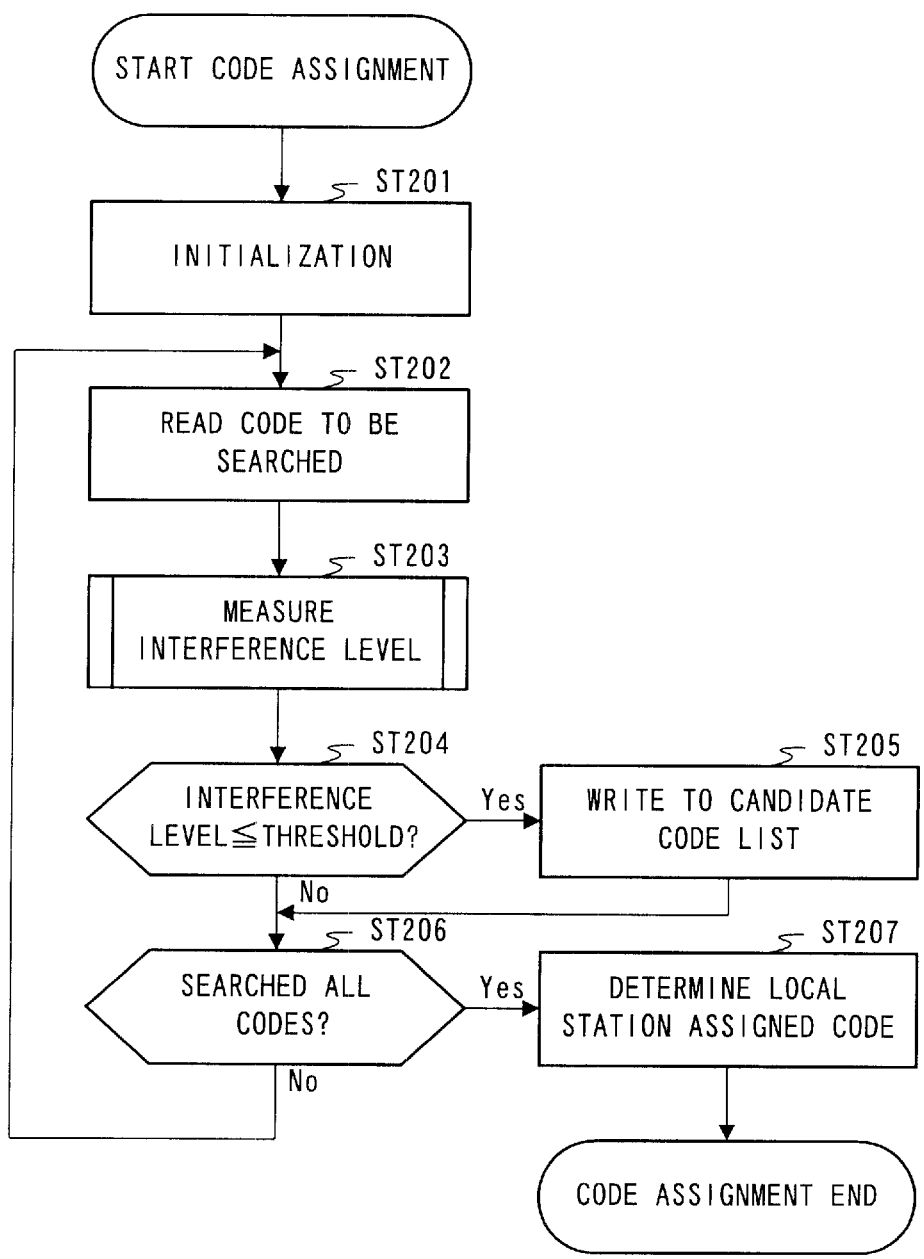
FIG. 2 is a flow diagram showing code assignment operation of the base station in Embodiment 1.

Then, the code assignment operation of base station 1 in Embodiment 1 is explained using a flow diagram in FIG. 2.

When base station 1 determines the code type of the station, the sections of the apparatus such as candidate code list 43 are initialized (ST201), and code reading section 44 reads one code type to be searched from all code list 42 and outputs it to code generation section 31 of interference level measuring section 30 (ST202).

Then, interference level measuring section 30 measures the level of an interference component of the received signal (ST203). To be more specific, code generation section 31 generates a code based on the input code type, despreading section 32 despreads the signal with the code generated and level calculation section 33 calculates the level of the despread signal.

Then, threshold determination section 45 compares the interference level measured by interference level measuring section 30 with a preset threshold (ST204) and if the interference level is lower than the threshold, the corresponding code type is written to candidate code list 43 (ST205).

After the operations from ST202 to ST205 are carried out on all code types stored in all code list 42 (ST206), code determination section 46 determines the code type of the station from among the code types stored in candidate code list 43 (ST207).

Thus, by measuring the interference level for each code type, storing code types whose interference level is lower than the threshold in the candidate code list and determining the code type of the station, it is possible to eliminate the need for additional code assignment design when a new base station is added, for example.

As a method of determining the code type of the station it is also possible to store not only code types but also interference levels in the candidate code list and determine the code type with the lowest interference level as the code type of the station. This allows communications with the code type of the best communication quality.

Moreover, as another method of determining the code type of the station it is also possible to store not only code types but also interference levels in the candidate code list and determine the code type with the highest interference level as the code type of the station. This makes it possible to improve the efficiency of repetitive use of a same code type and efficiently arrange base stations.

Embodiment 2

Figure 3:
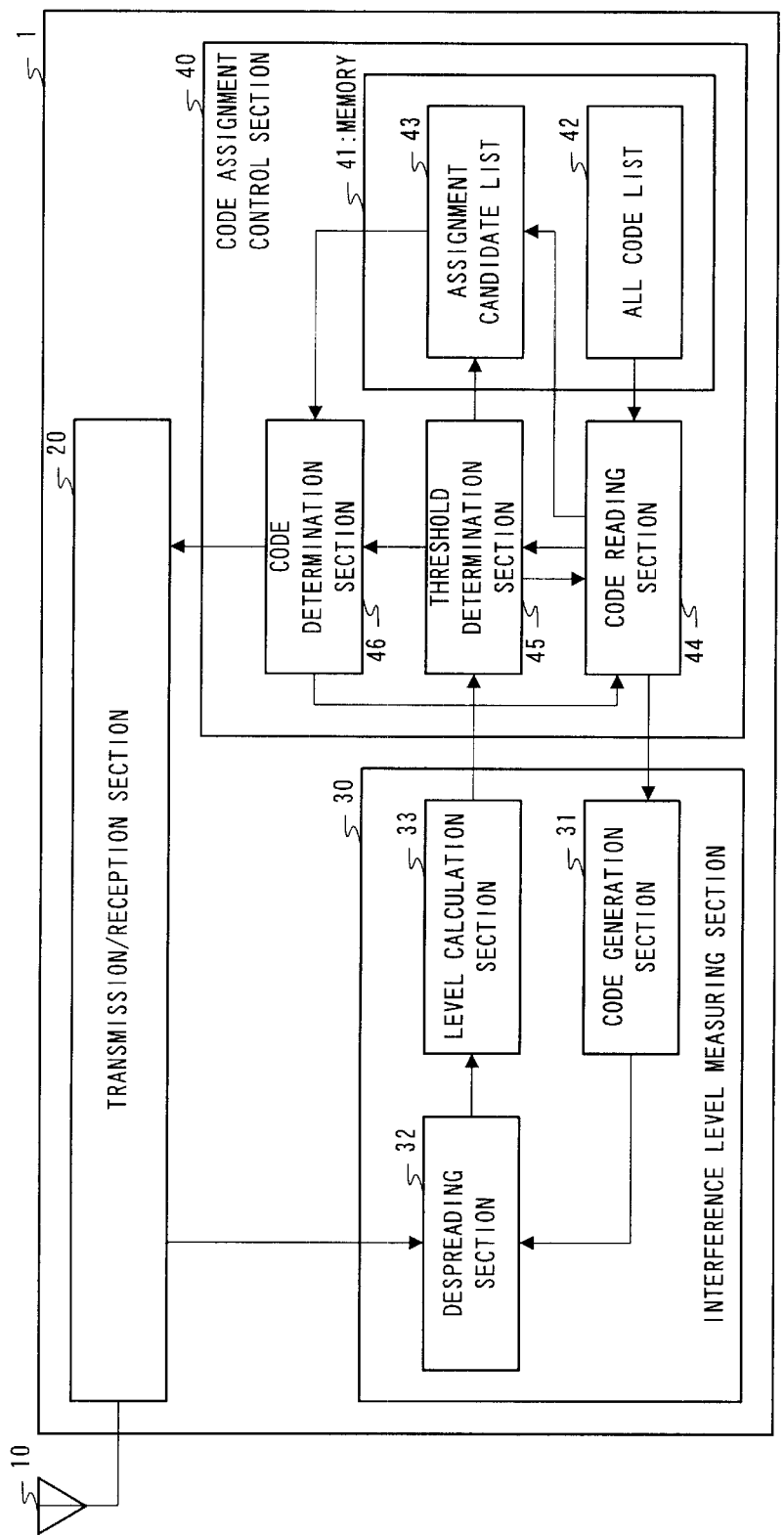
FIG. 3 is a block diagram showing a configuration of a base station in Embodiment 2.

Embodiment 2 is an embodiment giving priority to previously used codes in code assignment operation. FIG. 3 is a block diagram showing a configuration of a base station in Embodiment 2.

When carrying out code assignment operation, code reading section 44 in base station 1 in FIG. 3 reads a previously used code type of the station which is held in code determination section 46. If the interference level of the previously used code type of the station is lower than a threshold, threshold determination section 45 outputs the code type to code determination section 46. When the code type is input from threshold determination section 45, code determination section 46 outputs the code type to transmission/reception section as the code type of the station. The other components in base station 1 in FIG. 3 are the same as those in FIG. 1, and thus they are assigned the same numbers and their explanations are omitted.

Figure 4:
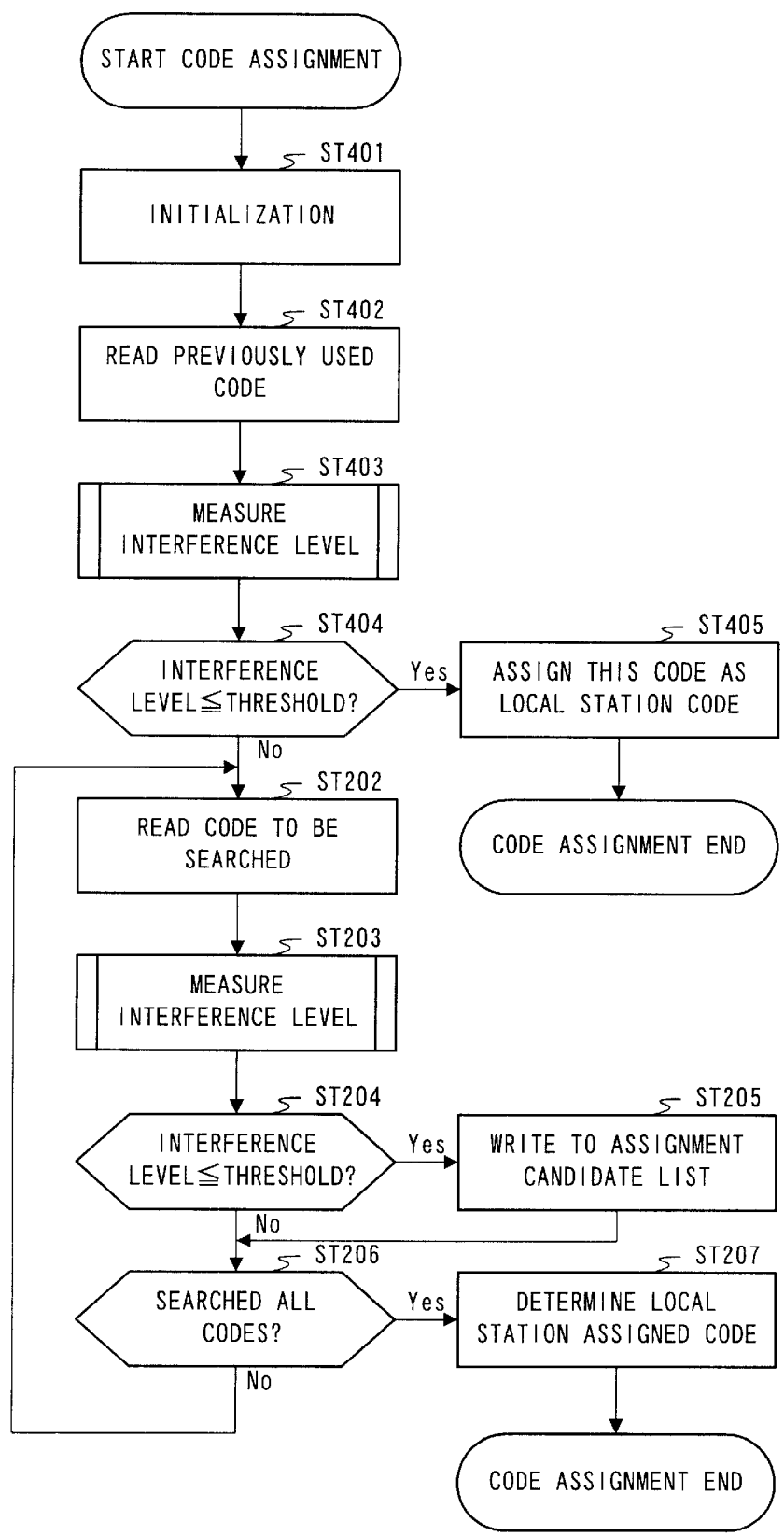
FIG. 4 is a flow diagram showing code assignment operation of the base station in Embodiment 2.

Then, the code assignment operation of the base station in Embodiment 2 is explained using a flow diagram in FIG. 4.

When base station 1 determines the code type of the station, the sections of the apparatus such as candidate code list 43 are initialized (ST401), and then code reading section 44 reads the previously used code type from code determination section 46 and outputs it to code generation section 31 of interference level measuring section 30 (ST402). Then, interference level measuring section 30 measures the level of an interference component of the received signal (ST403).

Then, threshold determination section 45 compares the interference level measured by interference level measuring section 30 with a preset threshold (ST404) and if the interference level is lower than the threshold, the previously used code type is output to code determination section 46 and code determination section 46 determines the code type as the code type of the station (ST405).

The subsequent operation when the interference level of the previously used code type is higher than the threshold is the same as the operations from ST202 to ST207 in the flow diagram in FIG. 2, and thus their explanations are omitted.

As seen above, preferentially using the previously used codes eliminates the need for measuring the interference level of other code types when the interference level of the previously used code type of the station is lower than a threshold, making it possible to shorten the time required for code assignment operation.

Embodiment 3

Figure 5:
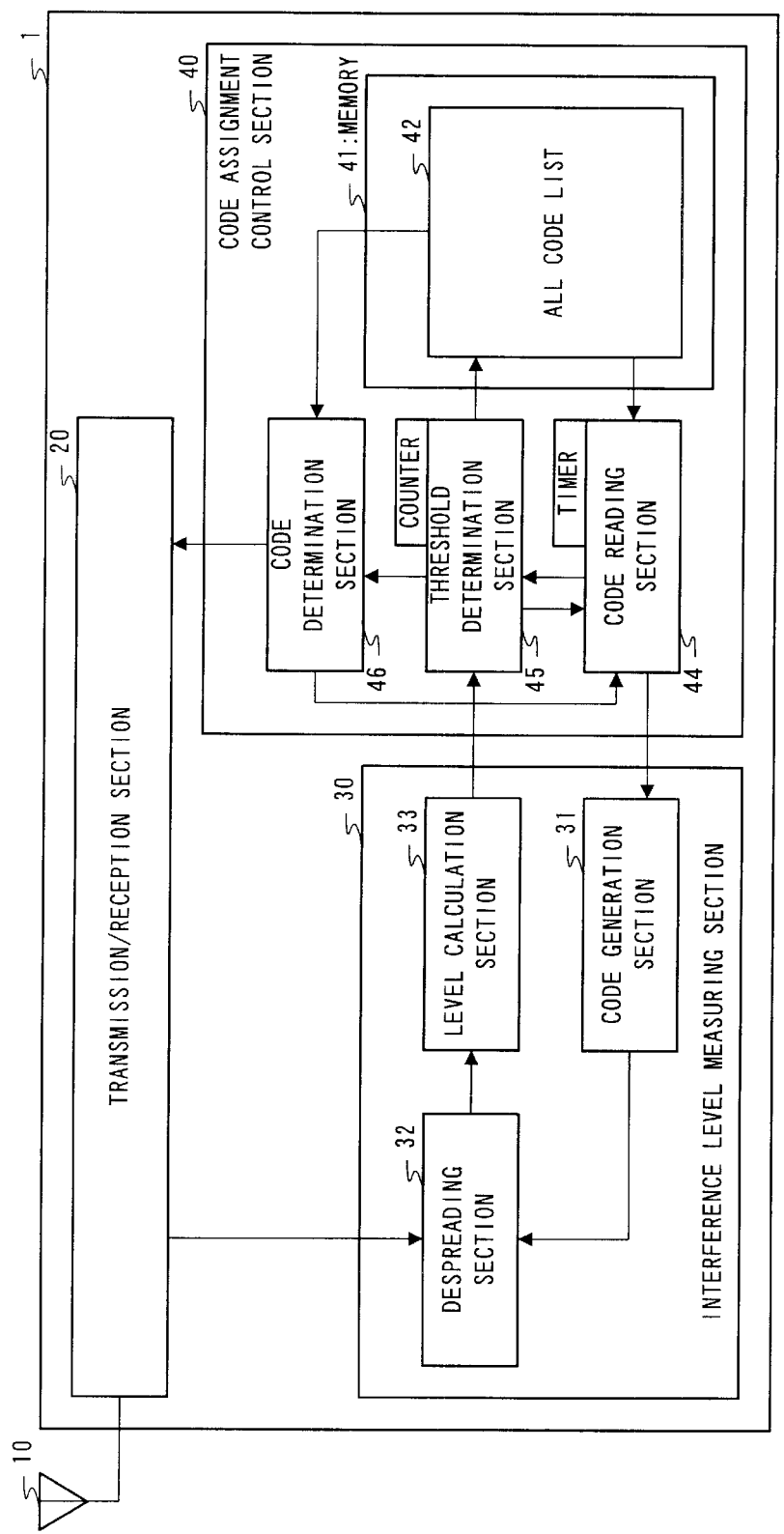
FIG. 5 is a block diagram showing a configuration of a base station in Embodiment 3.

Embodiment 3 is an embodiment that counts the number of times the interference level measured during a communication was lower than a threshold, determines priority based on the counted value and preferentially uses codes with high priority in code assignment operation. FIG. 5 is a block diagram showing a configuration of a base station in Embodiment 3.

In the base station in FIG. 5 compared to base station 1 in FIG. 1, memory 41 only comprises all code list 42 and all code list 42 stores not only code types but also the number of times (hereinafter referred to as "count value") the interference level measured during a communication of each code type was lower than the threshold.

Threshold determination section 45 incorporates a counter and if the interference level of the code type measured during a communication was lower than the threshold, it increments the counter and stores the count value together with the code type in all code list 42. Furthermore, threshold determination section 45 treats a code type with a higher count value as one with higher priority and sorts all code types in all code list 42 in descending order of priority.

Code reading section 44 measures time with a built-in timer and reads the assigned code type of the station stored in code determination section 46 at regular intervals from the beginning of the communication. When carrying out code assignment operation, code reading section 44 reads code types from all code list 42 in descending order of priority.

Level calculation section 33 subtracts the power level of the station input from transmission/reception section 20 from the interference level including the transmission power of the station calculated from the despread signal during the communication and calculates the true interference level.

The other components of base station 1 in FIG. 5 are the same as those in FIG. 1, and so they are assigned the same numbers as those in FIG. 1 and their explanations are omitted.

Figure 6:
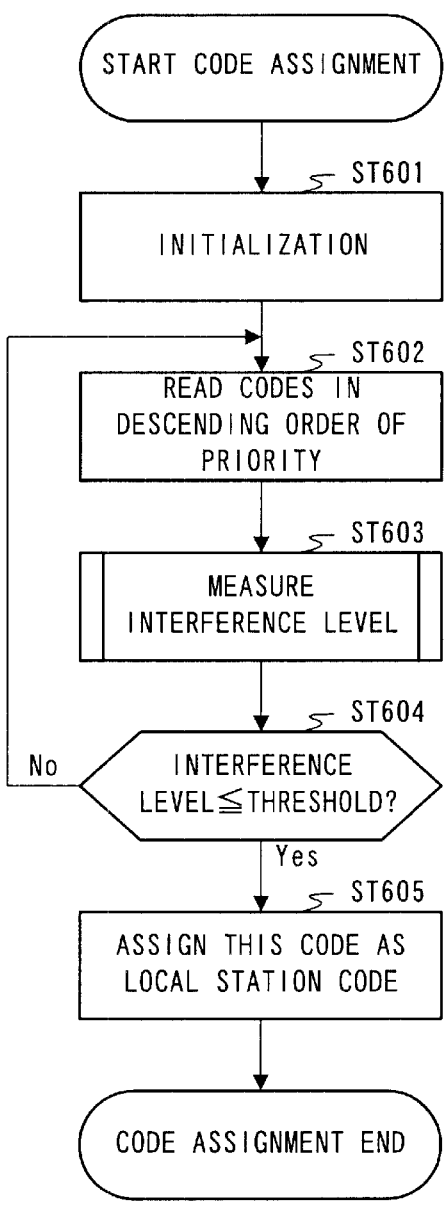
FIG. 6 is a flow diagram showing code assignment operation of the base station in Embodiment 3.

Then, the code assignment operation of the base station in Embodiment 3 is explained using a flow diagram in FIG. 6.

When base station 1 determines the code type of the station, the sections of the apparatus such as the timer of code reading section 44 are initialized (ST601), code reading section 44 reads the code types whose interference level has not been measured yet with the highest priority and outputs it to code generation section 31 of interference level measuring section 30 (ST602) and interference level measuring section 30 measures the level of an interference component of the received signal (ST603).

Then, threshold determination section 45 compares the interference level measured by interference level measuring section 30 with a preset threshold (ST604) and if the interference level is lower than the threshold, the code type is output to code determination section 46 and code determination section 46 determines the code type as the code type of the station (ST605). If the interference level is higher than the threshold in ST604, the operations from ST602 are repeated once again.

Figure 7:
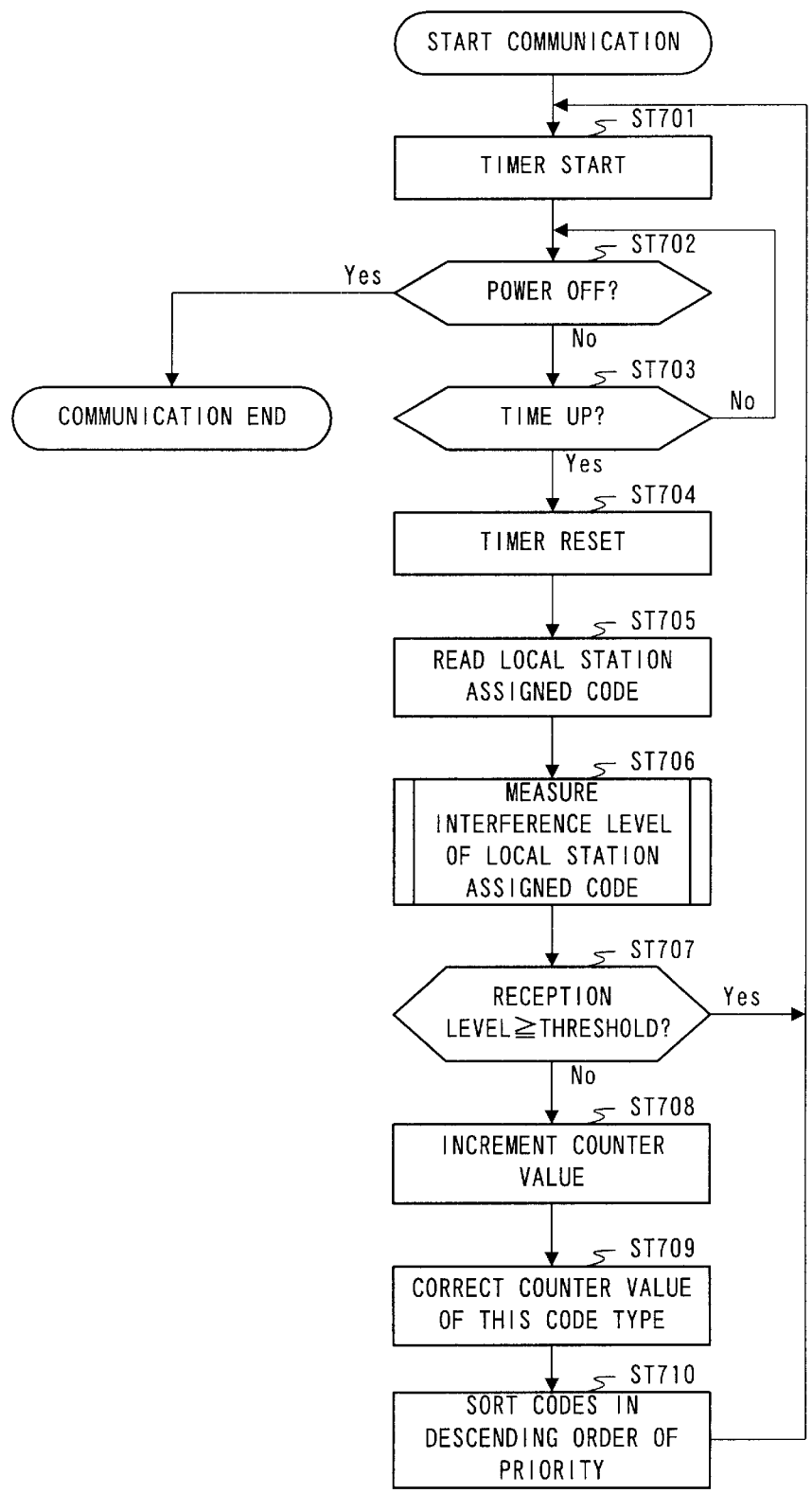
FIG. 7 is a flow diagram showing a priority update operation of the base station in Embodiment 3.

The priority update operation during a communication of base station 1 in Embodiment 3 is explained using a flow diagram in FIG. 7.

When base station 1 starts a communication, the timer of code reading section 44 starts (ST701). If a measurement continues for a certain period of time (ST703) without power interruption (ST702), the timer is reset (ST704), and code reading section 44 reads the assigned code type of the station from code determination section 46 and outputs it to code generation section 31 of interference level measuring section 30 (ST705).

Then, interference level measuring section 30 measures the level of an interference component of the received signal (ST706). To be more specific, code generation section 31 generates a code based on the input code type, despreading section 32 despreads the signal with the code generated and level calculation section 33 subtracts the power level of the station input from transmission/reception section 20 from the interference level including the transmission power of the station calculated from the despread signal and calculates the true interference level.

Then, threshold determination section 45 compares the interference level measured by interference level measuring section 30 with a preset threshold (ST707) and if the interference level is lower than the threshold, the built-in counter of threshold determination section 45 is incremented (ST708) and the count value in all code list 42 is corrected (ST709).

A code type with a higher count value is treated as one with higher priority and all code types in all code list 42 are sorted in descending order of priority. (ST710)

As seen above, by counting the number of times the assigned code type of the station during a communication was lower than the interference level, treating a code type with a higher count value as one with higher priority and measuring the interference level of code types in descending order of priority, it is possible to efficiently specify the code types whose interference level is lower than the threshold and shorten the time required for code assignment operation.

Embodiment 4

Figure 8:
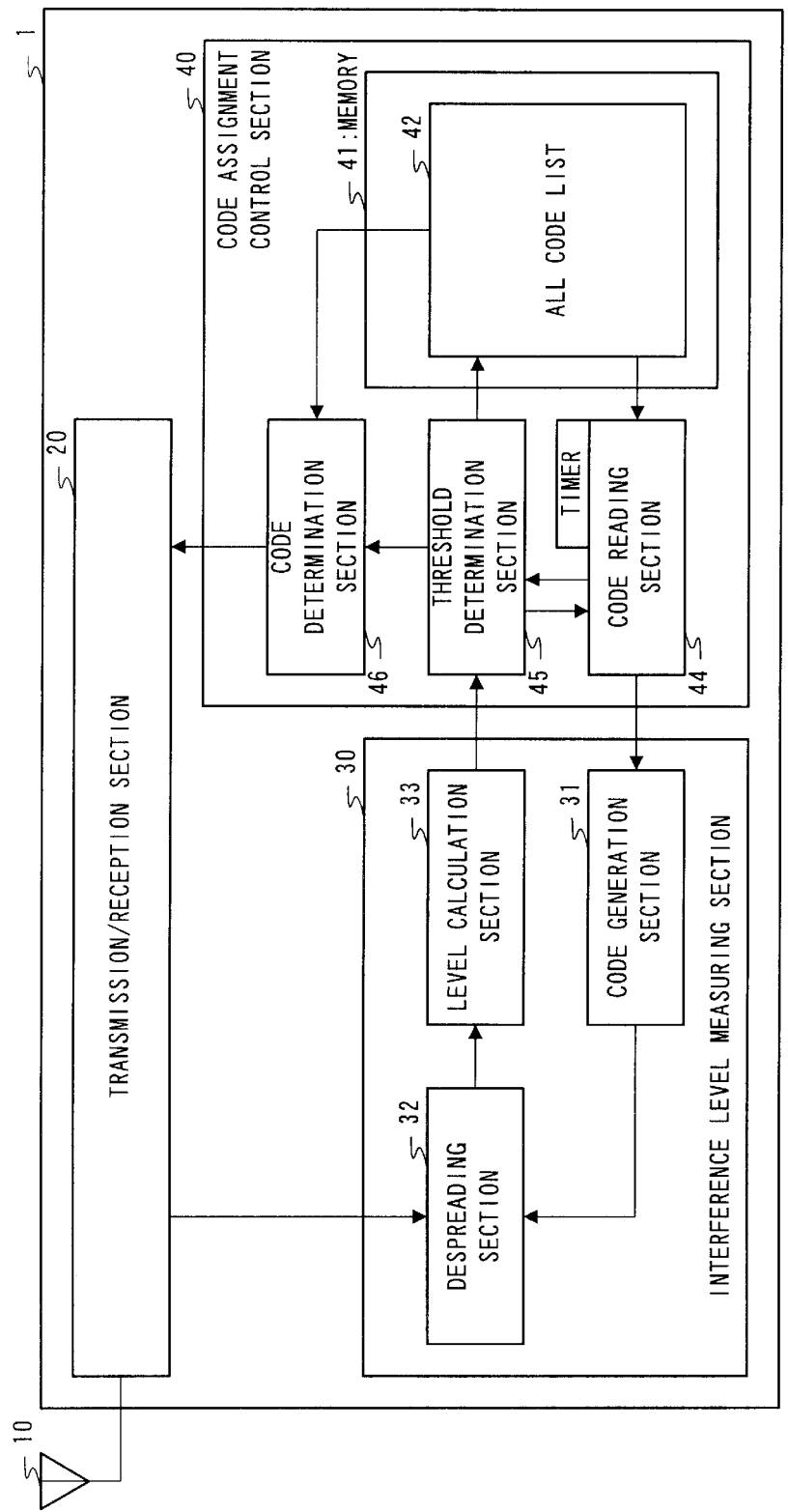
FIG. 8 is a block diagram showing a configuration of a base station in Embodiment 4.

Embodiment 4 is an embodiment that determines priority based on the measured interference level and preferentially uses codes with higher priority in code assignment operation. FIG. 8 is a block diagram showing a configuration of a base station in Embodiment 4. In the base station in FIG. 8 compared to base station 1 in FIG. 1, memory 41 only comprises all code list 42 and all code list 42 stores code types as well as the interface level of each code type.

Threshold determination section 45 treats a code type with a lower interference level as one with higher priority and sorts all code types in all code list 42 in descending order of priority. When carrying out code assignment operation, code reading section 44 reads code types from all code list 42 in descending order of priority.

The other components of base station 1 in FIG. 8 are the same as those in FIG. 1, and so they are assigned the same numbers as those in FIG. 1 and their explanations are omitted.

Figure 9:
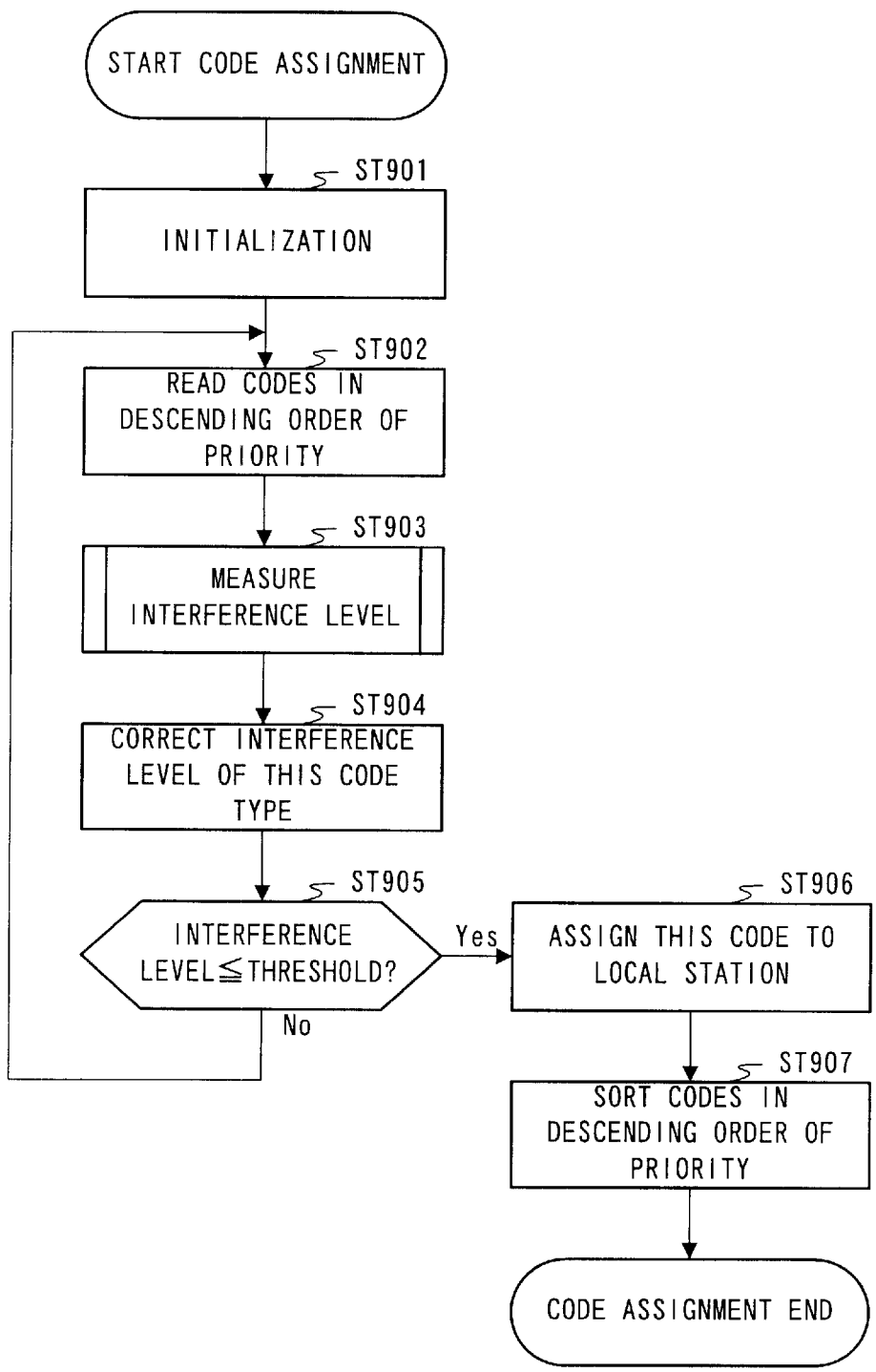
FIG. 9 is a flow diagram showing code assignment operation of the base station in Embodiment 4.

Then, the code assignment operation of the base station in Embodiment 4 is explained using a flow diagram in FIG. 9.

When base station 1 determines the code type of the station, the sections of the apparatus are initialized (ST901), code reading section 44 reads the code type with the highest priority whose interference level has not been measured yet and outputs it to code generation section 31 of interference level measuring section 30 (ST902) and interference level measuring section 30 measures the level of an interference component of the received signal (ST903).

Then, threshold determination section 45 updates the stored interference level to the interference level measured by interference measuring section 30 (ST904) and at the same time compares the interference level measured by interference level measuring section 30 with a preset threshold (ST905).

If the interference level is lower than the threshold, the code type is output to code determination section 46 and code determination section 46 determines the code type as the code type of the station (ST906) and treats a code type with a lower interference level as one with higher priority and sorts all code types in all code list 42 in descending order of priority (ST907). In ST905, if the interference level is higher than the threshold, the operations from ST902 are repeated once again.

Thus, by treating assigned code types with a higher interference level measured as ones with higher priority and measuring the interference level of code types in descending order of priority in code assignment operation, it is possible to efficiently specify code types whose interference level is lower than the threshold and shorten the time required for code assignment operation.

Embodiment 5

Embodiment 5 is an embodiment that measures the interference level of the assigned code of the station during a communication, determines priority based on the interference level measured and preferentially uses codes with higher priority in code assignment operation.

The configuration of a base station in Embodiment 5 is the same as that in FIG. 5 and the code assignment operation at the base station in Embodiment 5 is the same as that in Embodiment 4, and so their explanations are omitted.

Figure 10:
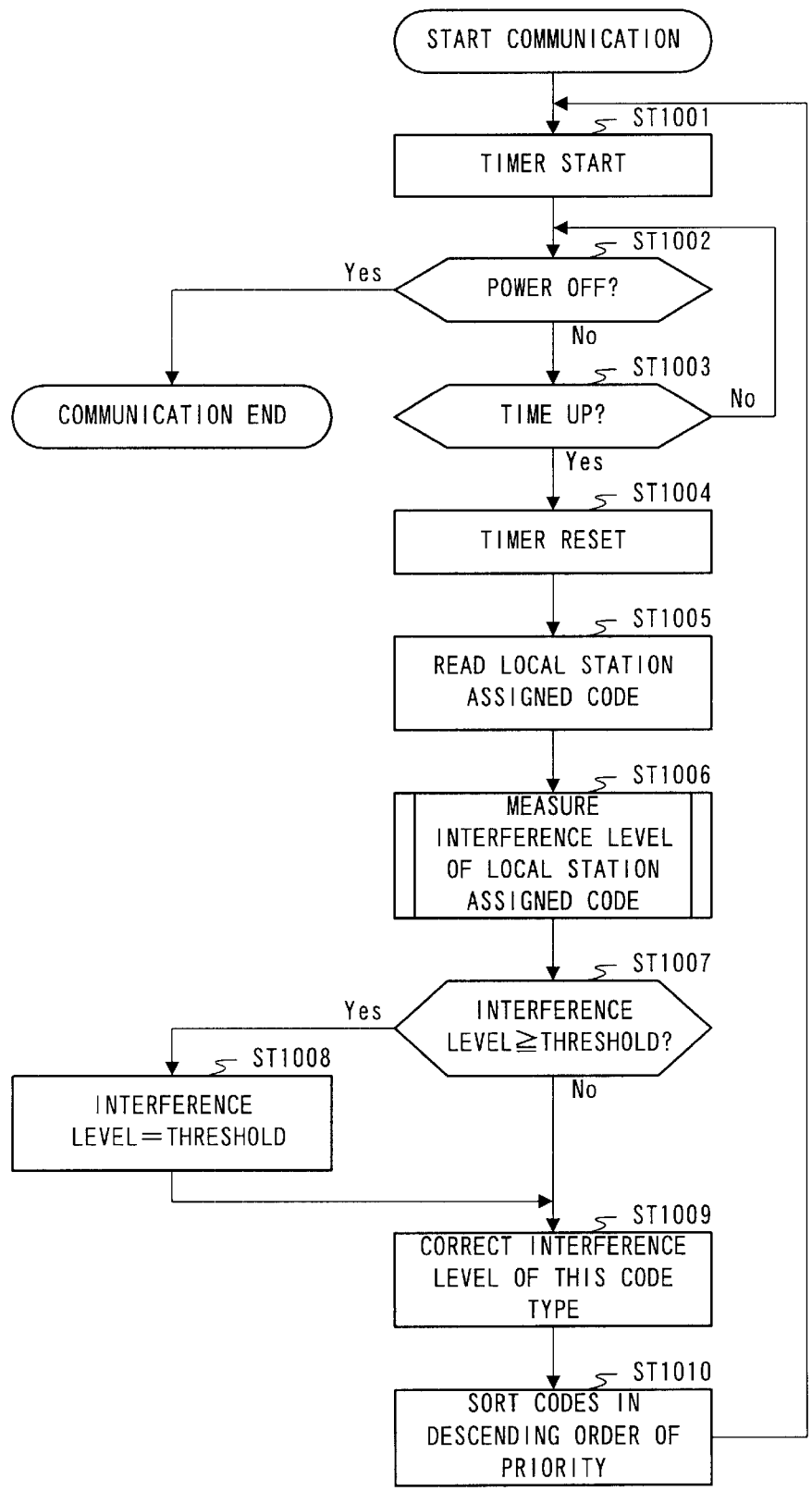
FIG. 10 is a flow diagram showing a priority update operation of a base station in Embodiment 5.

The priority update operation during a communication of the base station in Embodiment 5 is explained using a flow diagram in FIG. 10.

When base station 1 starts a communication, the timer of code reading section 44 starts (ST1001). If a measurement continues for a certain period of time (ST1003) without power interruption (ST1002), the timer is reset (ST1004), and code reading section 44 reads the assigned code type of the station from code determination section 46 and outputs it to code generation section 31 of interference level measuring section 30 (ST1005).

Then, interference level measuring section 30 measures the level of an interference component of the received signal (ST1006). To be more specific, code generation section 31 generates a code based on the input code type, despreading section 32 despreads the signal with the code generated and level calculation section 33 subtracts the power level of the station input from transmission/reception section 20 from the interference level including the transmission power of the station calculated from the despread level and calculates the true interference level.

Then, threshold determination section 45 compares the interference level measured by interference level measuring section 30 with a preset threshold (ST1007) and if the interference level is higher than the threshold, the interference level is considered to be the threshold (ST1008) and the interference level in the corresponding code type in all code list 42 is updated to the threshold (ST1009). If the interference level is lower than the threshold, the interference level in the corresponding code type in all code list 42 is updated to the measured interference level (ST1009).

A code type with a higher interference level is treated as one with higher priority and all code types in all code list 42 are sorted in order of priority (ST1010).

As seen above, by determining priority with reference to the interference level of the assigned code type of the station during a communication in addition to the interference level in code assignment operation and measuring the interference level of code types in descending order of priority in code assignment operation, it is possible to efficiently specify the code types whose interference level is lower than the threshold and shorten the time required for code assignment operation.

Embodiment 6

Figure 11:
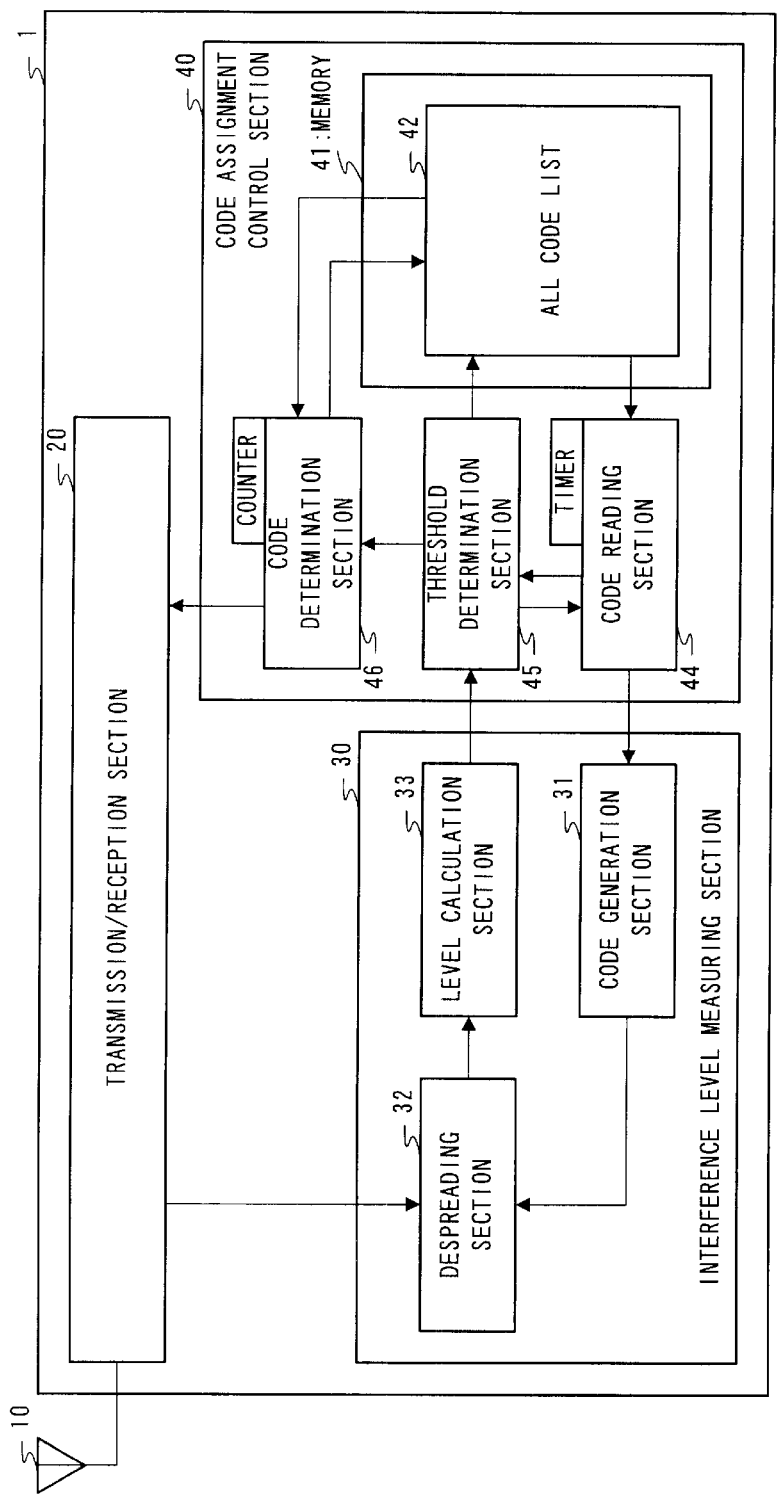
FIG. 11 is a block diagram showing a configuration of a base station in Embodiment 6.

Embodiment 6 is an embodiment that determines priority based on a count value indicating the frequency of use and preferentially uses codes with higher priority in code assignment operation. FIG. 11 is a block diagram showing a configuration of a base station in Embodiment 6. In the base station in FIG. 11, compared to base station 1 in FIG. 1, memory 41 only comprises all code list 42 and all code list 42 stores code types as well as a count value indicating the frequency of use.

Code determination section 46 incorporates a counter, increments the counter of the code type adopted as the assigned code type of the station and stores the count value in all code list 42. Threshold determination section 45 treats a code type with a higher count value as one with higher priority and sorts all code types in all code list 42 in descending order of priority.

The other components of base station 1 in FIG. 11 are the same as those in FIG. 1, and so they are assigned the same numbers as those in FIG. 1, and their explanations are omitted.

Figure 12:
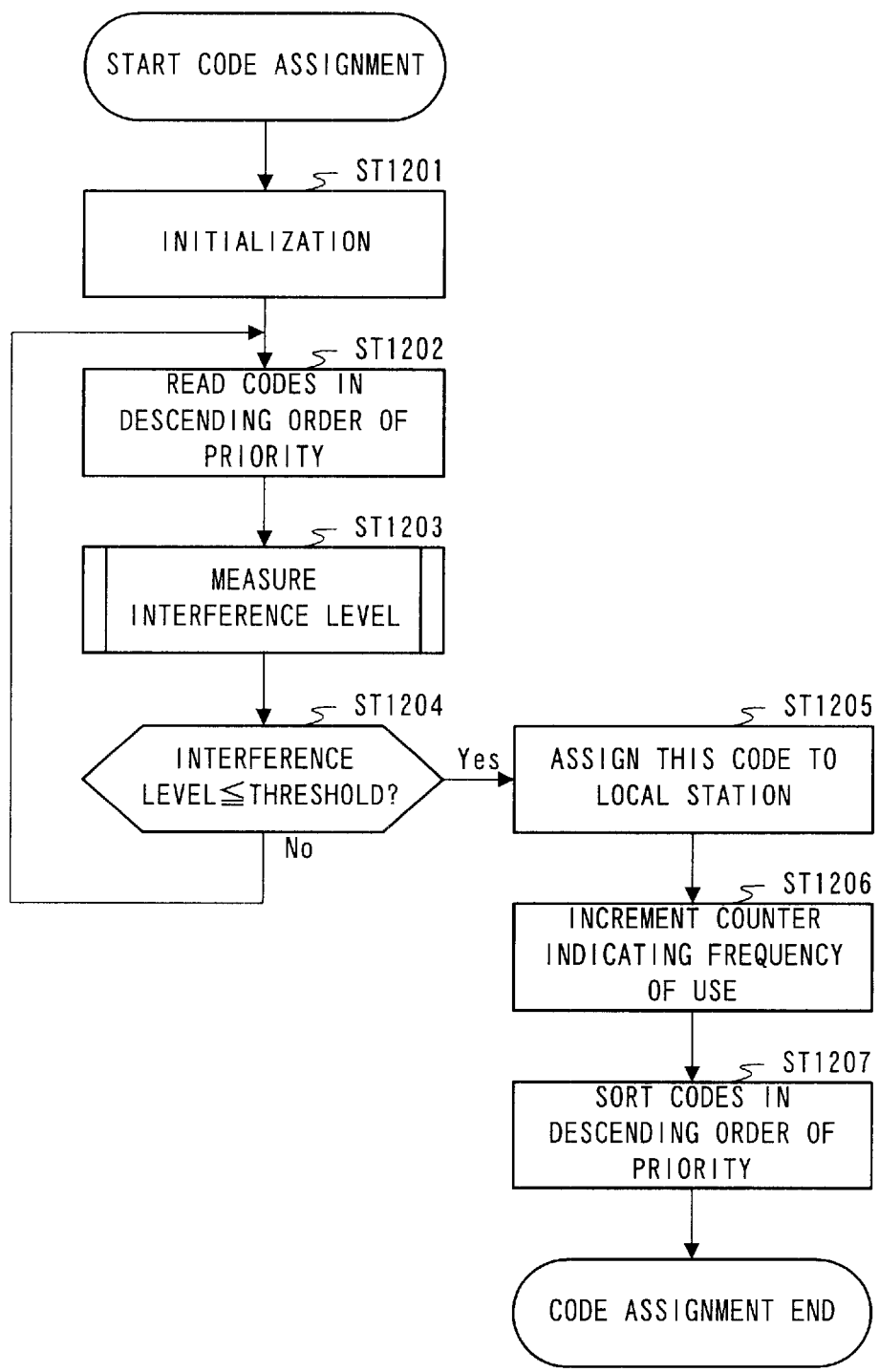
FIG. 12 is a flow diagram showing code assignment operation of the base station in Embodiment 6.

Then, the code assignment operation of the base station in Embodiment 6 is explained using a flow diagram in FIG. 12.

When base station 1 determines the code type of the station, the sections of the apparatus are initialized (ST1201), code reading section 44 reads the code type with the highest priority whose interference level has not been measured yet and outputs it to code generation section 31 of interference level measuring section 30 (ST1202) and interference level measuring section 30 measures the level of an interference component of the received signal (ST1203).

Then, threshold determination section 45 compares the interference level measured by interference level measuring section 30 with a preset threshold (ST1204) and if the interference level is lower than the threshold, the code type is output to code determination section 46 and code determination section 46 determines the code type as the code type of the station (ST1205) and increments the counter indicating the frequency of use (ST1206).

If the count value reaches a preset upper limit, it subtracts a certain value from the count values of all code types. However, if the count value after the subtraction is a negative value, the count value is set to 0. It is also possible to subtract a certain value only from the count value of the corresponding code type.

Then, threshold determination section 45 treats a code type with a higher count value as one with higher priority and sorts code types in all code list 42 in descending order of priority (ST1207). In ST1204, if the interference level is higher than the threshold, the operations from ST1202 are repeated once again.

Thus, by treating assigned code types with a higher frequency of use as ones with higher priority and measuring the interference level of code types in descending order of priority in code assignment operation, it is possible to efficiently specify code types whose interference level is lower than the threshold and shorten the time required for code assignment operation.

Embodiment 7

Embodiment 7 is an embodiment that fixes priority for a first code type group and determines priority based on the interference level measured for a second code type group and preferentially uses codes with higher priority in code assignment operation.

Here, the first code type group is a code type group having the same priority at all base stations and the second code type group is a code group having priority specific to each base station.

Figure 13:
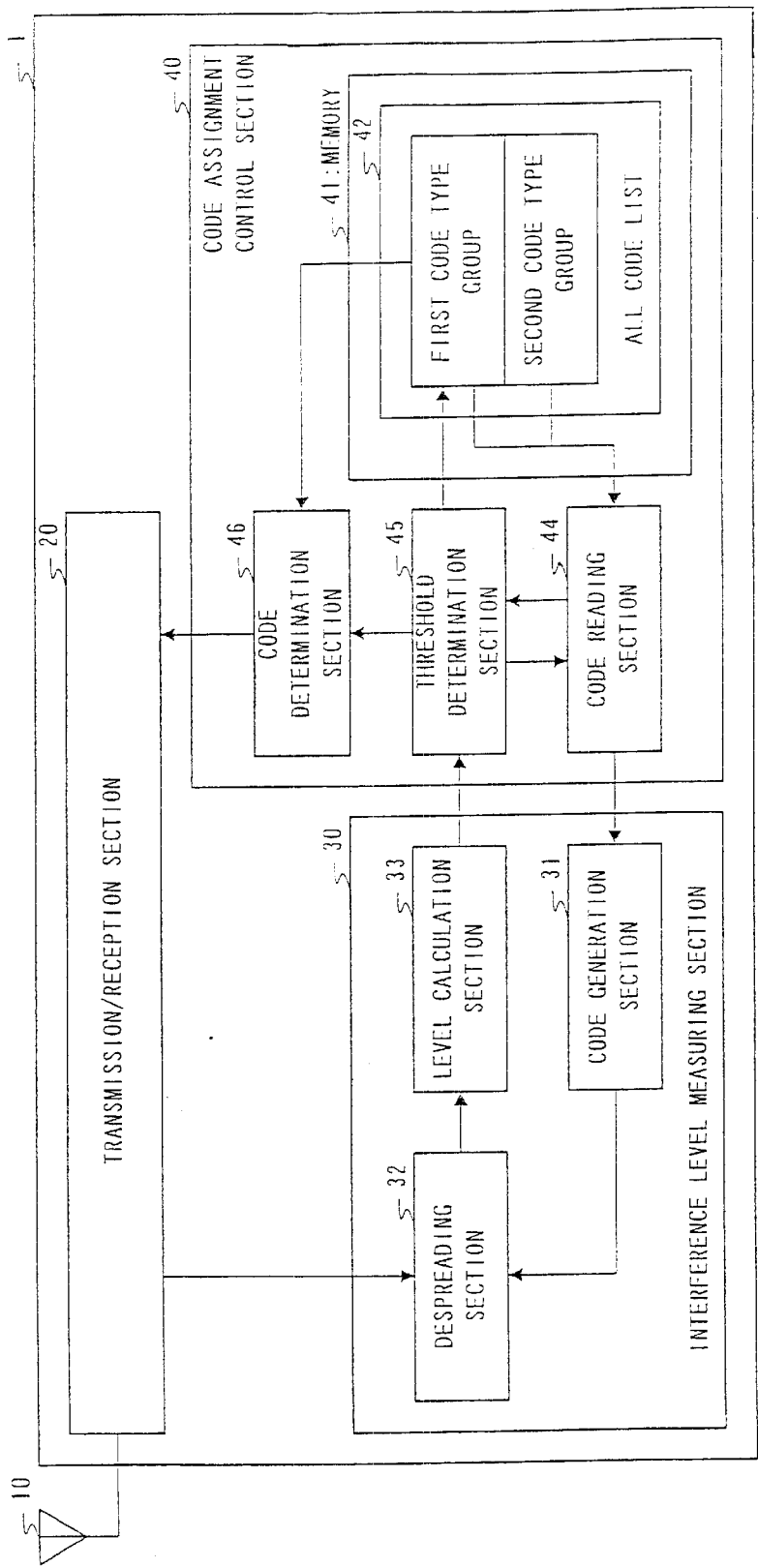
FIG. 13 is a block diagram showing a configuration of a base station in Embodiment 7.

FIG. 13 is a block diagram showing a configuration of a base station in Embodiment 7. In the base station in FIG. 13, compared to base station 1 in FIG. 8, all code list 42 stores code types divided into a first code type group and a second code type group and the second code type group is stored together with the interference level of each code type.

Threshold determination section 45 treats code types in the second code type group with a lower interference level as ones with higher priority, and sorts code types in all code list 42 in descending order of priority.

When carrying out code assignment operation, code reading section 44 reads code types of the first code type group in descending order of priority, and then reads code types of the second code type group in descending order of priority.

The other components in base station 1 in FIG. 13 are the same as those in FIG. 8, and so they are assigned the same numbers as those in FIG. 8 and their explanations are omitted.

Figure 14:
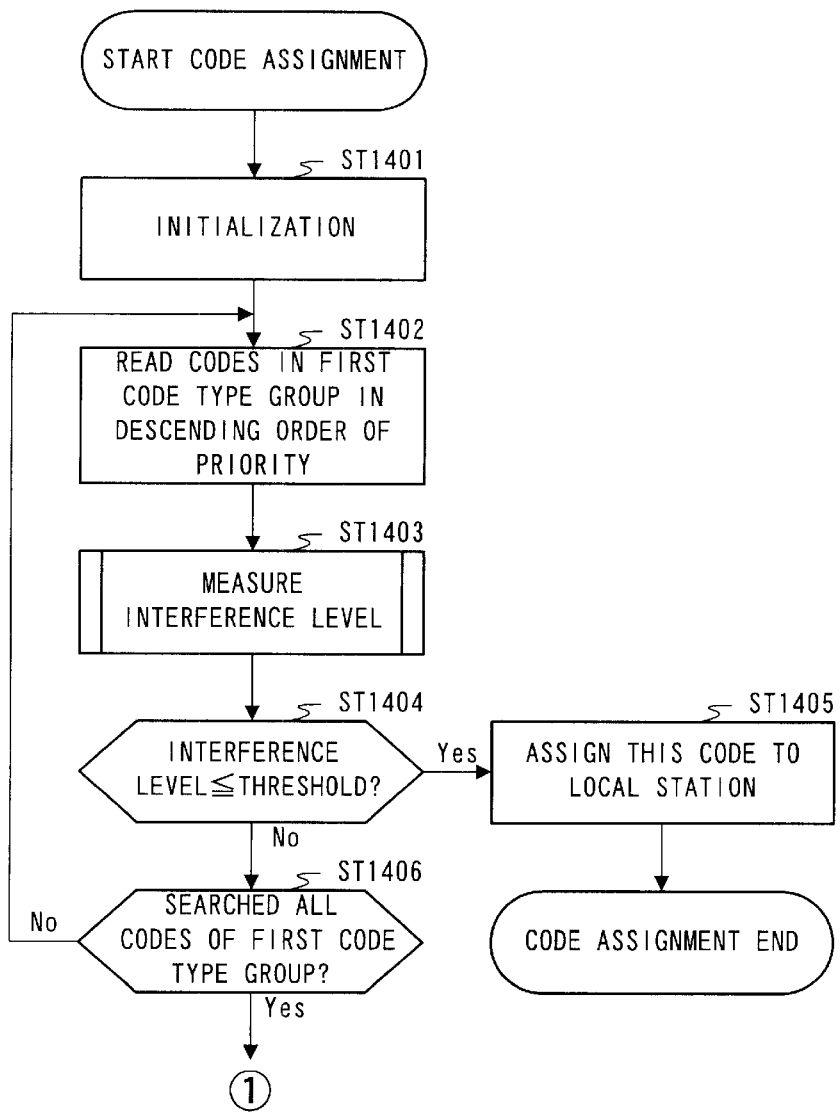
FIG. 14 is a flow diagram showing code assignment operation of the base station in Embodiment 7.
Figure 15:
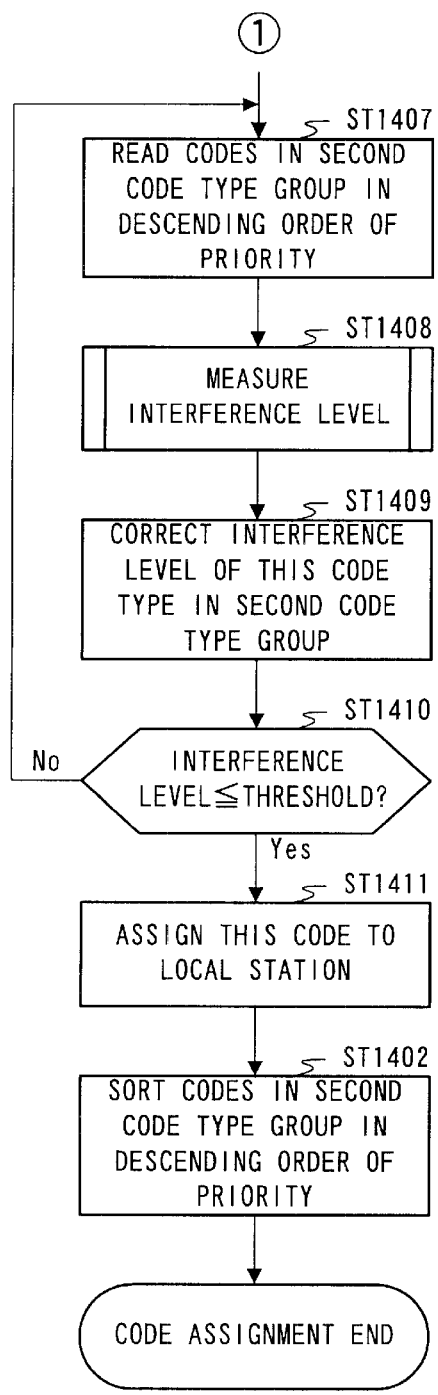
FIG. 15 is a flow diagram showing code assignment operation of the base station in Embodiment 7.

Then, the code assignment operation of the base station in Embodiment 7 is explained using flow diagrams in FIG. 14 and FIG. 15.

When base station 1 determines the code type of the station, the sections of the apparatus are initialized (ST1401), code reading section 44 reads the code type in the first code type group with the highest priority whose interference level has not been measured yet and outputs it to code generation section 31 of interference level measuring section 30 (ST1402) and interference level measuring section 30 measures the level of an interference component of the received signal (ST1403).

Then, threshold determination section 45 compares the interference level measured by interference level measuring section 30 with a preset threshold (ST1404) and if the interference level is lower than the threshold, the code type is output to code determination section 46 and code determination section 46 determines the code type as the code type of the station (ST1405).

In ST1404, if the interference level is higher than the threshold, the operations from ST1401 are repeated once again and when a search is completed for all code types of the first code type group (ST1406), code reading section 44 reads the code type in the second code type group with the highest priority whose interference level has not been measured yet and outputs it to code generation section 31 of interference level measuring section 30 (ST1407).

Then, interference level measuring section 30 measures the level of an interference component of the received signal (ST1408) and threshold determination section 45 updates the stored interference level to the interference level measured by interference level measuring section 30 (ST1409).

Then, threshold determination section 45 compares the interference level measured by interference level measuring section 30 with a preset threshold (ST1410) and if the interference level is lower than the threshold, the code type is output to code determination section 46 and code determination section 46 determines the code type as the code type of the station (ST1411).

A code type with a lower interference level is treated as one with higher priority and all code types in the second code type group are sorted in descending order of priority (ST1412). In ST1410, if the interference level is higher than the threshold, the operations from ST1407 are repeated once again.

As seen above, by fixing priority in the first code type group, treating a code type in the second code type group with a higher interference level measured as one with higher priority and measuring the interference level of code types in descending order of priority, it is possible to efficiently specify the code types whose interference level is lower than the threshold and shorten the time required for code assignment operation.

Embodiment 8

Embodiment 8 is an embodiment that randomly selects a certain number of code types in code assignment operation, preferentially measures the interference level from the selected codes and uses them as the assigned codes of the station. A base station in Embodiment 8 is the same as the base station shown in FIG. 1.

When carrying out code assignment operation, code reading section 44 of base station 1 in Embodiment 8 randomly selects a certain number of code types from all code list 42, reads the selected code types one by one and outputs them to interference level measuring section 30.

Figure 16:
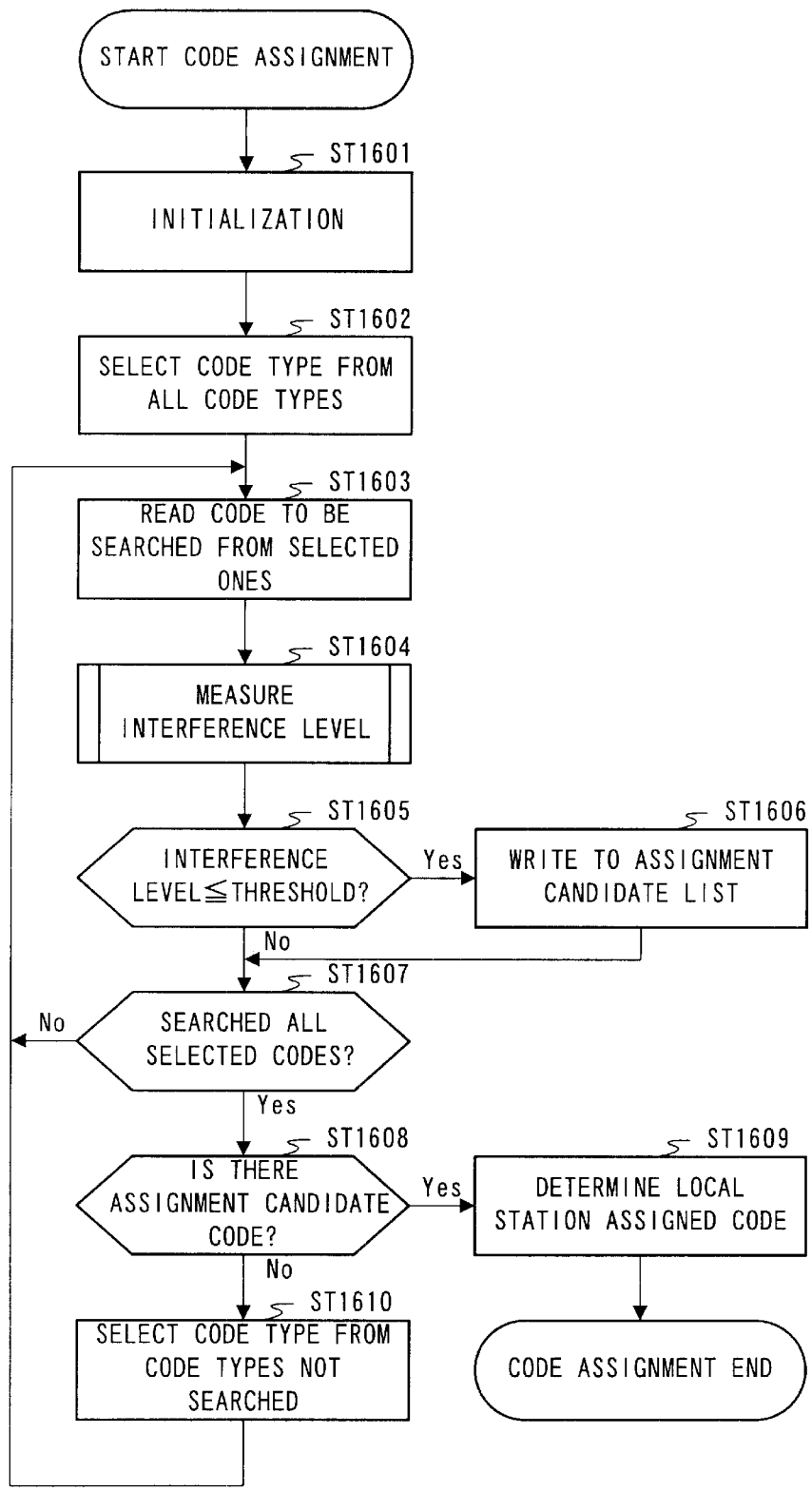
FIG. 16 is a flow diagram showing code assignment operation of a base station in Embodiment 8.

Then, the code assignment operation of base station 1 in Embodiment 8 is explained using a flow diagram in FIG. 16.

When base station 1 determines the code type of the station, the sections of the apparatus such as candidate code list 43 are initialized (ST1601), code reading section 44 selects a certain number of code types to be searched from all code list 42 (ST1602), reads one code type from among the selected code types and outputs it to code generation section 31 of interference level measuring section 30 (ST1603).

Then, interference level measuring section 30 measures the level of an interference component of the received signal (ST1604) and threshold determination section 45 compares the interference level measured by interference level measuring section 30 with a preset threshold (ST1605) and if the interference level is lower than the threshold, the corresponding code type as well as the interference level is written to candidate code list 43 (ST1606).

Then, the operations from ST1603 to ST1606 are carried out on all the selected code types (ST1607).

After the operations from ST1603 to ST1606 are carried out on all the selected code types, if there are assignment candidate codes (ST1608), code determination section 46 determines the code type stored in candidate code list 43 with the lowest interference level as the code type of the station (ST1609). In ST1608, if there is no assignment candidate code, a certain number of code types to be searched from among the code types that have not been selected yet and the operations from ST1603 to ST1607 are repeated (ST1602).

Thus, selecting a certain number of code types and assigning codes can shorten the time required for code assignment operation.

By the way, as the method of selecting a certain number of code types, it is also possible to select a code type to be searched first and then select a certain number of code types to be aligned in order starting from this code type. This makes it possible to simplify the circuit to select a certain number of code types.

Embodiment 9

Embodiment 9 is a code assignment method by which a radio communication system classifies code types into several groups and assigns one of them to each base station as a preferred group. A base station in Embodiment 9 is the same as the base station shown in FIG. 1.

When carrying out code assignment operation, code reading section 44 of base station 1 in Embodiment 9 sets a code group to be searched from all code list 42, reads the set code types one by one and outputs them to interference level measuring section 30.

If the interference level of the code type is not lower than a threshold, threshold determination section 45 deletes all code type data included in the code group to which the code type belongs from candidate code list 43.

Figure 17:
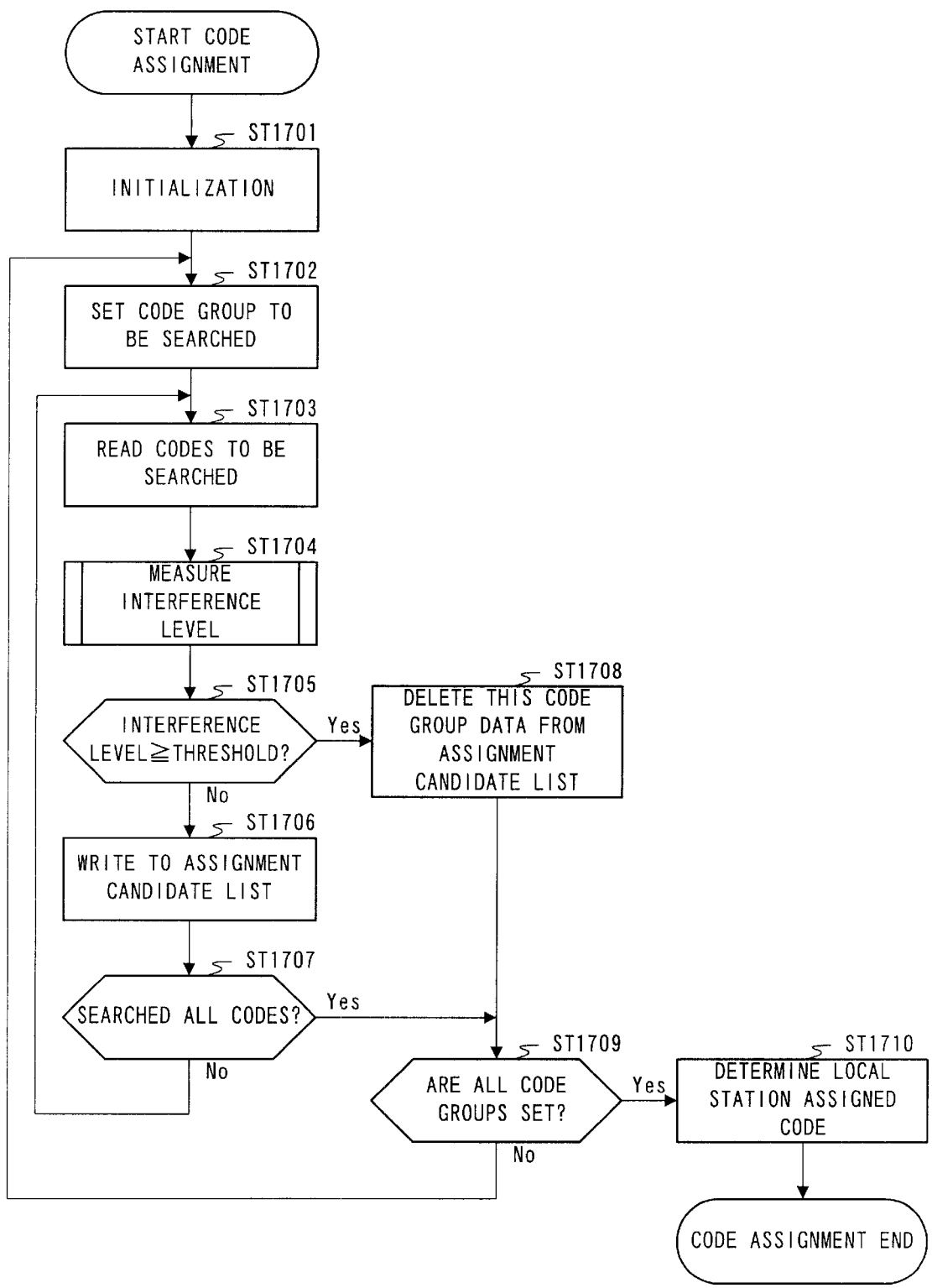
FIG. 17 is a flow diagram showing code assignment operation of a base station in Embodiment 9.

Then, the code assignment operation of base station 1 in Embodiment 9 is explained using a flow diagram in FIG. 17.

When base station 1 determines the code type of the station, the sections of the apparatus such as candidate code list 43 are initialized (ST1701), code reading section 44 sets a code group to be searched from all code list 42 (ST1702), reads one code type from the selected code group and outputs it to code generation section 31 of interference level measuring section 30 (ST1703).

Then, interference level measuring section 30 measures the level of an interference component of the received signal (ST1704) and threshold determination section 45 compares the interference level measured by interference level measuring section 30 with a preset threshold (ST1705) and if the interference level is lower than the threshold, the corresponding code type as well as the interference level is written to candidate code list 43 (ST1706).

Then, the operations from ST1703 to ST1706 are carried out on all the selected code types (ST1707).

In ST1705, if the interference level exceeds the threshold, all code type data included in the code group to which the code type belongs are deleted from candidate code list 43 (ST1708).

After the operations from ST1702 to ST1708 are repeated until all code groups are set (ST1709), code determination section 46 determines the code type stored in candidate code list 43 with the lowest interference level as the code type of the station (ST1710).

At this time, the code group containing the code type determined as the code type of the station is designated as the preferred group of the station.

Thus, even if a radio communication system adopts a system that classifies code types into several groups and assigns one of them to each base station as the preferred group, it is possible to eliminate the need for additional code assignment design when a new base station is added, for example.

Embodiment 10

Figure 18:
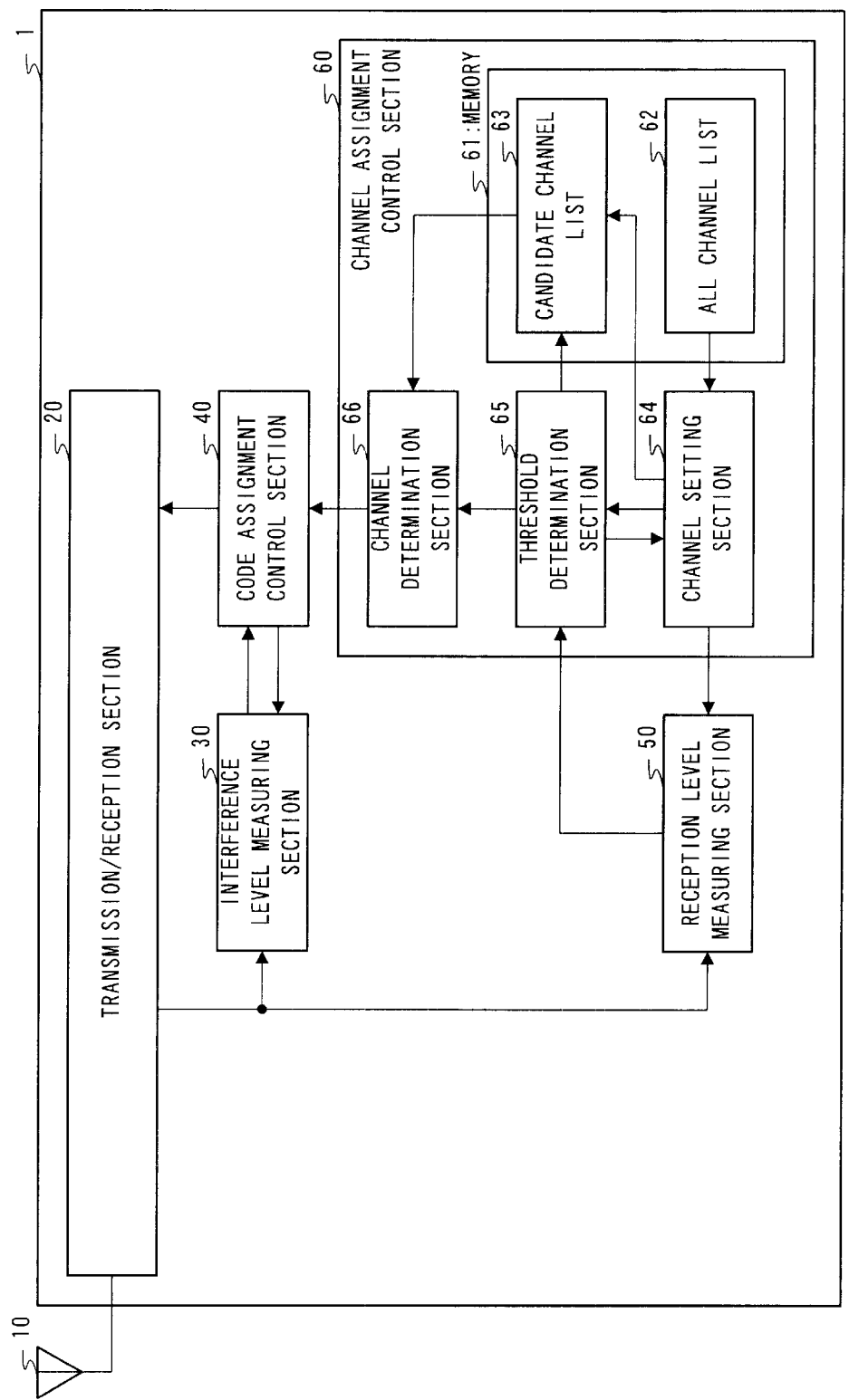
FIG. 18 is a block diagram showing a configuration of a base station in Embodiment 10.

Embodiment 10 is a code assignment method when there are a plurality of channels on an assigned frequency axis. FIG. 18 is a block diagram showing a configuration of a base station in Embodiment 10 of the present invention.

Base station 1 in FIG. 18 mainly comprises transmission/reception section 20 that transmits/receives signals to/from a mobile station and receives an interference signal transmitted from another base station via antenna 10, interference level measuring section 30 that measures the interference level of a signal received by transmission/reception section 20, code assignment control section 40 that carries out code type assignment control based on the interference level, reception level measuring section 50 that measures the reception level of the signal received by transmission/reception section 20 and channel assignment control section 60 that carries out channel assignment control based on the measured reception level.

Channel assignment control section 60 comprises memory 61 that stores channels and memory 61 comprises all channel list 62 that stores all channels in a list form and candidate channel list 63 that stores assignment candidate channels in a list form. Channel assignment control section 60 also comprises channel setting section 64 that sets channels to be measured from all channel list 62 and outputs them to reception level measuring section 50, threshold determination section 65 that determines assignment candidate channels from the reception level input from reception level measuring section 50 and a preset threshold and writes the channel number to be an assignment candidate to candidate channel list 63 and channel determination section 66 that determines the channel of the station used from candidate channel list 63 and outputs it to code assignment control section 40.

Interference level measuring section 30 and code assignment control section 40 adopts one of Embodiment 1 to Embodiment 9.

Figure 19:
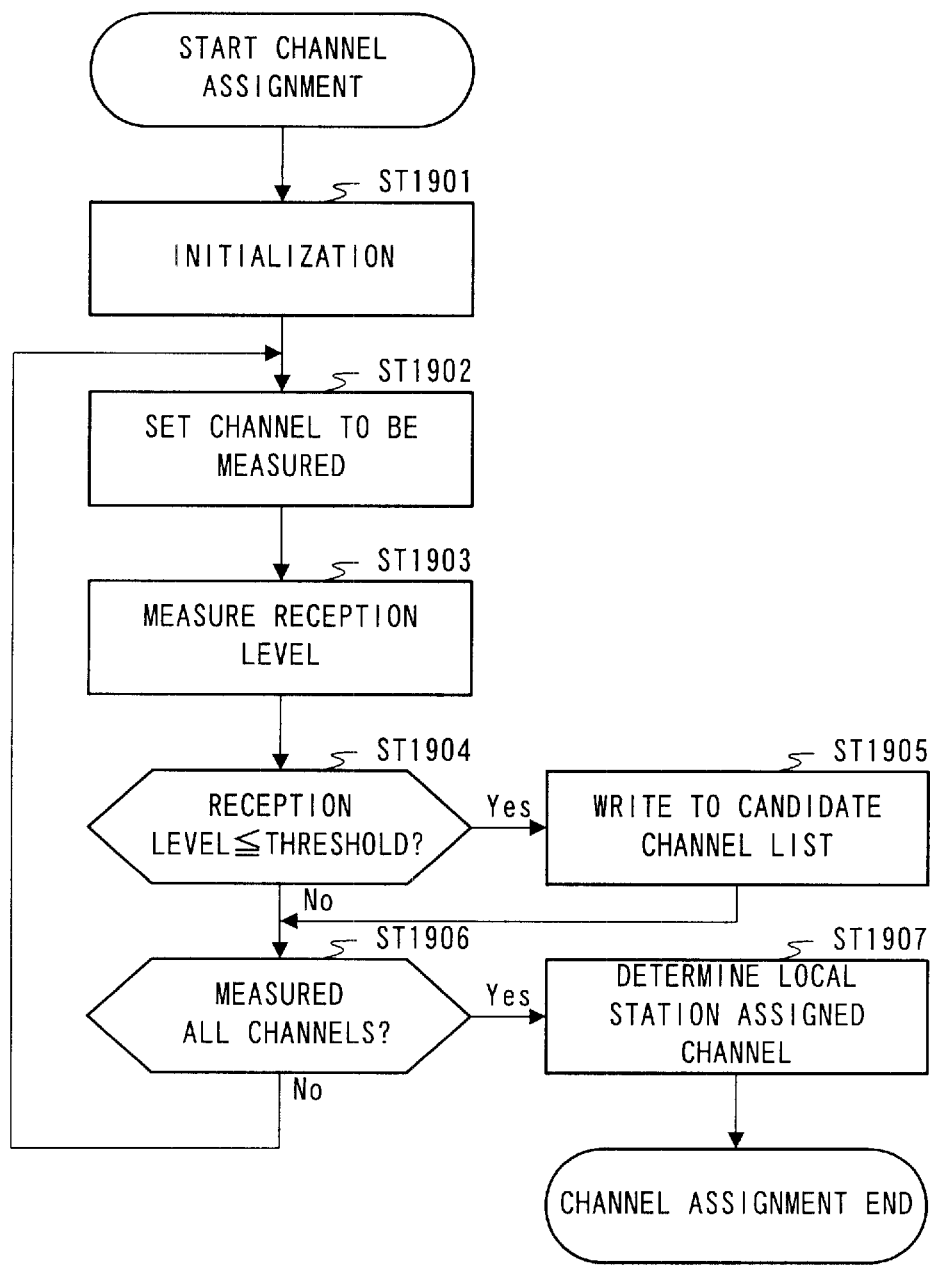
FIG. 19 is a flow diagram showing code assignment operation of a base station in Embodiment 10.

Then, the channel assignment operation of base station 1 in Embodiment 10 is explained using a flow diagram in FIG. 19.

When base station 1 determines the channel of the station, the sections of the apparatus such as candidate channel list 63 are initialized (ST1901), channel setting section 64 reads one channel to be searched from all channel list 62 and outputs it to reception level measuring section 50 (ST1902) and reception level measuring section 50 measures the reception level of the received signal (ST1903).

Then, threshold determination section 65 compares the reception level measured by reception level measuring section 50 with a preset threshold (ST1904) and if the reception level is lower than the threshold, the corresponding channel number is written to candidate channel list 63 (ST1905).

Then, the operations from ST1902 to ST1905 are carried out on all channels stored in all channel list 62 (ST1906) and channel determination section 66 determines the channel of the station from among channels stored in the candidate channel list (ST1907).

After the channel assignment operation is completed, through the determined channel of the station, interference level measuring section 30 and code assignment control section 40 carry out the code assignment operation explained in one of Embodiment 1 to Embodiment 9 and determine the code type of the station.

As seen above, measuring the reception level for each channel, determining the channel of the station and carrying out code assignment operation through the determined channel of the station eliminates the need for theoretical design for assigning codes to all base stations even if there are a plurality of channels on the assigned frequency axis.

As the method of determining the channel of the station, it is also possible to store channels as well as the reception levels in the candidate channel list and determine the one with the lowest reception level as the channel of the station. This allows communications using the channel with the best communication quality.

Furthermore, as the method of determining the channel of the station, it is also possible to store channels as well the reception levels in the candidate channel list and determine the one with the highest reception level as the channel of the station. This makes it possible to improve the efficiency in repeatedly using the same channel and efficiently arrange base stations.

The embodiments above explained cases where a code type was used as code specification information, but the present invention is not limited to this, and can use other information such as code phase. Furthermore, the embodiments above can be combined among them as appropriate.

In the embodiments above, the frequency of implementing code assignment operation can be set as appropriate such as implementing code assignment operation at specific intervals or when power is turned on.

The base station apparatus in the embodiments above can switch code types when the communication quality deteriorates by the mobile station apparatus monitoring the communication quality and reporting it to the base station apparatus and the base station apparatus carrying out code assignment operation based on the communication quality related information from the mobile station apparatus.

Figure 20:
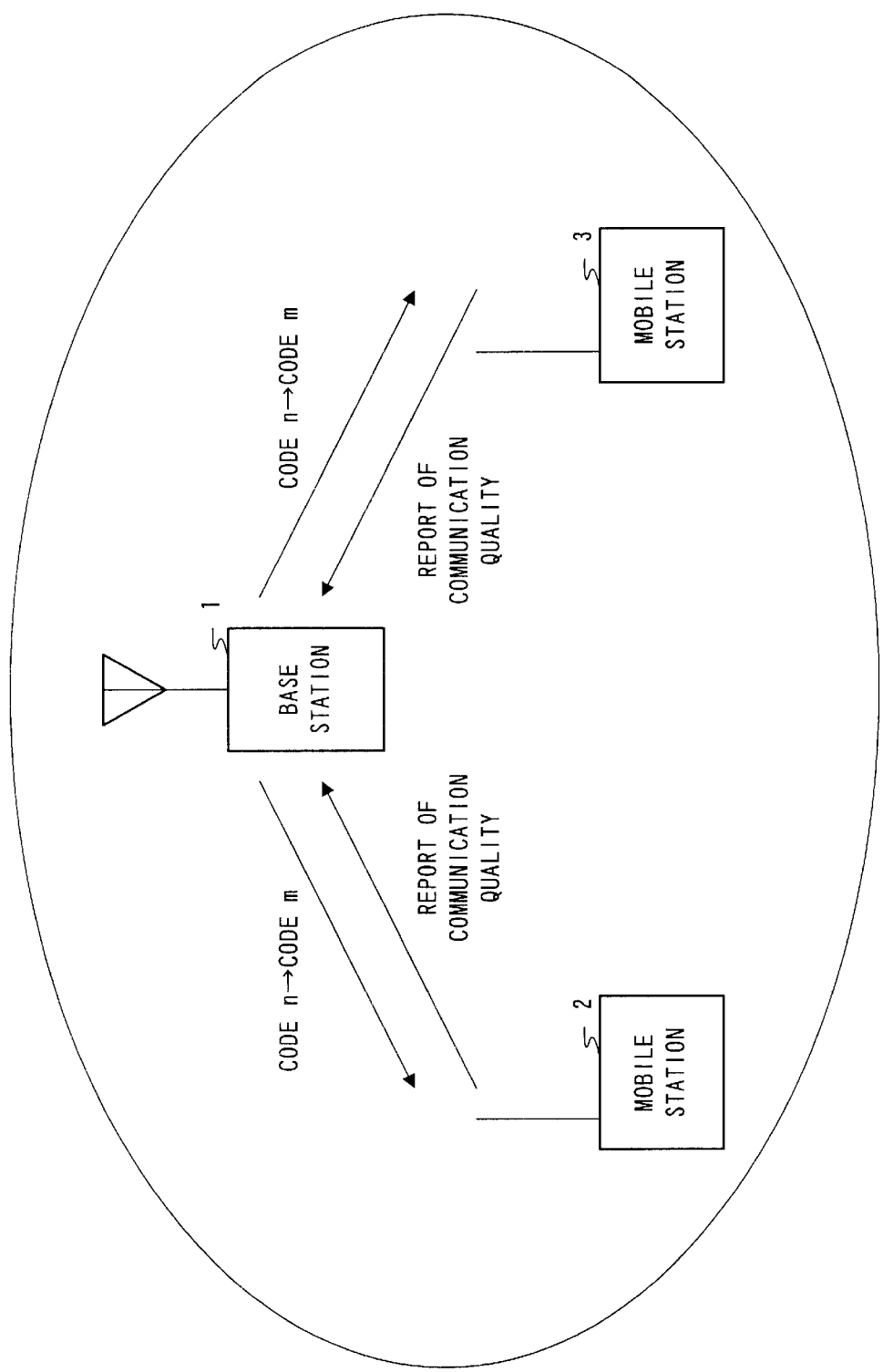
FIG. 20 is a system diagram showing a radio communication system including the CDMA base station apparatus of the present invention.

An explanation for this code type switching method is given below. FIG. 20 is a system diagram showing a radio communication system including the CDMA base station apparatus of the present invention. Mobile station apparatus 2 and mobile station apparatus 3 in FIG. 20 are located in a radio zone which is an area allowing communications with base station apparatus 1 and have a function to monitor the communication quality and report it to the base station apparatus.

Now, suppose base station apparatus 1 transmits a signal to mobile station apparatus 2 and mobile station apparatus 3 using code type n and the transmission/reception section determines whether the communication quality has deteriorated or not based on the communication quality related information received from mobile station apparatus 2 and mobile station apparatus 3.

If base station apparatus 1 determines that the communication quality has deteriorated, it first determines code type m to be updated using the code assignment method explained in one of the embodiments above.

Then, base station apparatus 1 notifies mobile station apparatus 2 and mobile station apparatus 3 of the time required until the code is changed. When the notified time has elapsed, base station apparatus 1 switches code type n to code type m.

Thus, switching a code type when the communication quality deteriorates can maintain the communication quality optimal even if interference from neighboring cells occurs.

Furthermore, when there are a plurality of code types to be searched, it is possible to share code types to be searched between the base station and mobile station, search respective shared code types, report the search results from the mobile station to the base station, organize the search results by the base station and switch the code types based on these search results.

If the mobile station can perform RAKE reception with a plurality of code types, it is also possible, when switching code types, for the base station to transmit a signal using both code types before and after the update and for the mobile station to perform RAKE reception of both code types before and after the update.

In the case of a radio communication system that performs transmission from the base station to mobile station using a plurality of code types, it is normally possible to determine all code types used using the code assignment method explained in one of the embodiments above. When switching the code type whose communication quality has deteriorated in this radio communication system, if nothing other than the code to be switched is changed, it is possible to carry out smooth switching of code types without deteriorating the overall communication quality.

As explained above, the CDMA base station apparatus and code assignment method of the present invention can eliminate the need for theoretical design for assigning codes to all base stations even if a new base station is added.

The present invention is not limited to the above described embodiments, and various variations and modifications may be possible without departing from the scope of the present invention.

This application is based on the Japanese Patent Application No. HEI 10-269608 filed on Sep. 24, 1998, entire content of which is expressly incorporated by reference herein.

What is claimed is:

1. A CDMA base station apparatus comprising:
a code reader that reads stored code specification information;
an interference level measurer that measures an interference level of a signal despread with the code specification information;
a threshold determiner that selects the code specification information corresponding to an interference level smaller than a predetermined threshold as a code specification information candidate for said CDMA base station apparatus; and
a code determiner that determines, from the code specification information selected by said threshold determiner, the code specification information corresponding to the highest interference level for said CDMA base station apparatus.

2. The CDMA base station apparatus according to claim 1,
wherein, for each code specification information, said threshold determiner counts the number of times the interference level has become smaller than the predetermined threshold; and
wherein, based upon the count of said threshold determiner, said code reader reads a code specification information having a higher count than another code specification information before reading the another code specification information.

3. The CDMA base station apparatus according to claim 2,
wherein said code reader reads the code specification information for said CDMA base station apparatus during communication.

4. The CDMA base station apparatus according to claim 1, further comprising:
a first code specification information group that contains code specification information with a reading order; and
a second code specification information group that contains code specification information without a reading order,
wherein said code reader, when reading the code specification information from said second code specification information group, reads a code specification information corresponding to a smaller interference level than another code specification information before reading the another code specification information.

5. The CDMA base station apparatus according to claim 1, further comprising:
a plurality of code specification information groups containing code specification information; and
a code assignment controller that, when one of the plurality of code specification information groups contains the code specification information corresponding to a smaller interference level than the predetermined threshold, determines the code specification information for said CDMA base station apparatus without measuring the interference level corresponding to others of the code specification information.

6. The CDMA base station apparatus according to claim 5, wherein a predetermined number of code specification information form a code specification information group.

7. The CDMA base station apparatus according to claim 5, wherein said threshold determiner is configured to not select the code information candidate of said CDMA base station apparatus from a code specification information group containing code specification information corresponding to a measured interference level greater than the predetermined threshold.

8. The CDMA base station apparatus according to 1, further comprising:
a reception level measurer that measures a reception level of a received signal;
a channel setter that reads out a stored channel number and outputs the channel number to said reception level measurer;
a reception level threshold determiner that selects the channel number having a reception level smaller than a predetermined threshold as a channel number candidate for said CDMA base station apparatus; and a channel determiner that determines, from the channels selected by said threshold determiner, the channel having the highest reception level for said CDMA base station apparatus.

9. A code assignment method for use of a CDMA base station apparatus comprising:

reading stored code specification information;

measuring an interference level of a signal despread with the code specification information;

selecting the code specification information corresponding to an interference level smaller than a predetermined threshold as a code information candidate for said CDMA base station apparatus; and determining, from the code specification information selected by said threshold determiner, the code specification information corresponding to the highest interference level for said CDMA base station apparatus.

10. The code assignment method according to claim 9, further comprising:

counting, for each code specification information, the number of times the interference level has become smaller than the predetermined threshold; and reading, based upon the count, the code specification information having a higher count than another code specification information before reading the another code specification information.

11. The code assignment method according to claim 10, further comprising:

reading the code specification information for said CDMA base station apparatus during communication, and comparing the measured interference level to the predetermined threshold;

wherein the counting is performed for each code specification information read.

12. The code assignment method according to claim 9, wherein, when the code specification information is read from a code specification information group containing code specification information without a reading order, a code specification information having a greater interference level than another code specification information is read before the another code specification information.

13. The code assignment method according to claim 9, wherein a number of times each code specification information has been set as the code specification information for said CDMA base station apparatus is counted; and wherein, with reference to the respective numbers of times counted, a code specification information having a greater number than another code specification information is read before the another code specification information.

14. The code assignment method according to claim 9, wherein when one of a plurality of code specification information groups contains the code specification information corresponding to an interference level smaller than the predetermined threshold, the code specification information for said CDMA base station apparatus is determined without measuring the interference level corresponding to other of the code specification information.

15. The code assignment method according to claim 14, wherein a predetermined number of code specification information form a code specification information group.

16. The code assignment method according to claim 14, wherein a code specification information group containing the code specification information corresponding to a measured interference level greater than the predetermined threshold is not subject to the selection of the code information candidate for said CDMA base station apparatus.

* * * * *